(12) United States Patent
Lai et al.

(10) Patent No.: US 9,002,760 B2
(45) Date of Patent: Apr. 7, 2015

(54) NEURAL SYSTEM OF ADAPTIVE BEHAVIOR

(75) Inventors: Dihui Lai, San Diego, CA (US); Yinyin Liu, San Diego, CA (US); Victor Hokkiu Chan, Del Mar, CA (US); Michael Campos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/593,114

(22) Filed: Aug. 23, 2012

(65) Prior Publication Data

US 2014/0058988 A1    Feb. 27, 2014

(51) Int. Cl.
*G06F 15/18*    (2006.01)
*G06N 3/02*    (2006.01)
*G06N 3/04*    (2006.01)

(52) U.S. Cl.
CPC . *G06N 3/02* (2013.01); *G06N 3/049* (2013.01)

(58) Field of Classification Search
USPC .......................................................... 706/14
See application file for complete search history.

(56) References Cited

U.S. PATENT DOCUMENTS

| | | | |
|---|---|---|---|
| 6,819,956 B2 | 11/2004 | DiLorenzo | |
| 7,231,254 B2 | 6/2007 | DiLorenzo | |
| 7,444,309 B2* | 10/2008 | Branke et al. | 706/13 |
| 8,021,317 B2* | 9/2011 | Arnold et al. | 602/28 |
| 8,043,245 B2* | 10/2011 | Campos et al. | 602/27 |
| 8,454,546 B2* | 6/2013 | Campos et al. | 602/27 |
| 8,599,290 B2* | 12/2013 | Chan et al. | 348/241 |
| 8,706,662 B2* | 4/2014 | Chan et al. | 706/15 |
| 2006/0271118 A1 | 11/2006 | Libbus et al. | |
| 2008/0162391 A1 | 7/2008 | Izhikevich | |
| 2008/0201284 A1 | 8/2008 | Massaquoi et al. | |

FOREIGN PATENT DOCUMENTS

WO    WO0206016 A1    1/2002

OTHER PUBLICATIONS

Optic nerve signals in a neuromorphic chip I: Outer and inner retina models, Zaghloul, K.A.; Boahen, K. Biomedical Engineering, IEEE Transactions on vol. 51 , Issue: 4 DOI: 10.1109/TBME.2003.821039 Publication Year: 2004 , pp. 657-666.*

(Continued)

*Primary Examiner* — Michael B Holmes
(74) *Attorney, Agent, or Firm* — Rupit M. Patel

(57) ABSTRACT

Certain aspects of the present disclosure provide methods and apparatus for generating neural adaptive behavior, which may be based on neuromodulator-mediated meta-plasticity and/or gain control. In this manner, flexible associations between sensory cues and motor actions are generated, which enable an agent to efficiently gather rewards in a changing environment. One example method generally includes receiving one or more input stimuli; processing the received input stimuli to generate an output signal, wherein the processing is modulated with a first neuromodulation signal generated by a gain control unit; controlling the gain control unit to switch between at least two different neural activity modes, wherein at least one of a level or timing of the first neuromodulation signal generated by the gain control unit is determined based on the neural activity modes; and sending the output signal to an output unit.

72 Claims, 12 Drawing Sheets

(56) References Cited

OTHER PUBLICATIONS

Timed Delivery of Reward Signals in an Autonomous Robot (Abstract Only) Hallam, B. ; Floreano, D. ; Meyer, J. ; Hayes, G. From animals to animats 7:Proceedings of the Seventh International Conference on Simulation of Adaptive Behavior (Abstract Only) Copyright Year: 2002.*

Adaptive critic autopilot design of Bank-to-turn missiles using fuzzy basis function networks Chuan-Kai Lin Systems, Man, and Cybernetics, Part B: Cybernetics, IEEE Transactions on vol. 35 , Issue: 2 DOI: 10.1109/TSMCB.2004.842246 Publication Year: 2005 , pp. 197-207.*

Aston-Jones, et al., "An Integrative Theory of Locus Coeruleus-Norepinephrine Function: Adaptive Gain and Optimal Performance," Annu. Rev. Neurosci., 2005, vol. 28, pp. 403-450.

Aston-Jones, et al., "Prominent projections from the orbital prefrontal cortex to the locus coeruleus (LC) in monkey," (Nov. 2002), Society for Neuroscience, Abstract Archive: 2000-2005, 1 page.

Berridge, et al., "The locus coeruleus-noradrenergic system: modulation of behavioral state and state-dependent cognitive processes," Brain Research Reviews, vol. 42, (2003), pp. 33-84.

Campos, et al., "Orbitofrontal cortical activity during repeated free choice," J Neurophysiol, 107; 3246-3255, 2012.

Izhikevich, E. M., "Solving the Distal Reward Problem Through Linkage of STDP and Dopamine Signaling", in Cerebral Cortex, pp. 2443-2452, Oct. 2007.

Krichmar, "The Neuromodulatory System: A Framework for Survival and Adaptive Behavior in a Challenging World," International Society for Adaptive Behavior (2008), nVol. 16, No. 6, pp. 385-399.

McClure, et al., "An exploration-exploitation model based on norepinephrine and dopamine activity," Center for the Study of Brain, Mind, and Behavior, Princeton University, Princeton, NJ, 2006, 8 pages.

Pawlak, et al., "Timing is not everything: neuromodulation opens the STDP gate," Frontiers in Synaptic Neuroscience, Oct. 2010, vol. 2, Article 146, pp. 1-14.

Roesch, et al., "Neuronal Activity Related to Reward Value and Motivation in Primate Frontal Cortex," Science, vol. 304, Apr. 2004, pp. 307-310.

Schultz, et al., "A Neural Substrate of Prediction and Reward," Science, vol. 275, Mar. 1997, pp. 1593-1599.

Shen, et al., "Dichotomous Dopaminergic Control of Striatal Synaptic Plasticity," Published in final edited form as: Science. Aug. 8, 2008; 321(5890): 848-851.

Sutton, et al., "Reinforcement Learning: An Introduction," The MIT Press, Cambridge, Massachusetts; London, England, 2005, retrieved from http://www.cs.ualberta.ca/%7Esutton/book/ebook/node1.html Jun. 22, 2005 9.04.31.

Usher, et al., "The Role of Locus Coeruleus in the Regulation of Cognitive Performance," Science, vol. 283, Jan. 1999. pp. 549-554.

Wallis, et al., "Neuronal activity in primate dorsolateral and orbital prefrontal cortex during performance of a reward preference task," European Journal of Neuroscience, vol. 18, 2003, pp. 2069-2081.

Zhu, et al., "Projection from the orbitofrontal cortex to the locus coeruleus in monkeys revealed by anterograde tracing," (Oct. 2004), Society for Neuroscience—Abstract Archive: 2000-2005, 1 page.

International Search Report and Written Opinion—PCT/US2013/055875—ISA/EPO—Feb. 6, 2014.

Krichmar J.L., et al., "A Neural Approach to Adaptive Behavior and Multi-Sensor Action Selection in a Mobile Device", Proceedings / 2002 IEEE International Conference on Robotics and Automation; May 11-15, 2002, Washington, D.C, IEEE Service Center, Piscataway, NJ, Jan. 1, 2002, pp. 3864-3869, XP008078413, DOI: 10.1109/R0B0T.2002.1014323, ISBN: 978-0-7803-7272-6.

Tan A-H., et al., "Integrating Temporal Difference Methods and Self-Organizing Neural Networks for Reinforcement Learning With Delayed Evaluative Feedback", IEEE Transactions on Neutral Networks, Service Center, Piscataway, NJ, US, vol. 19, No. 2, Feb. 1, 2008, pp. 230-244, XP011195495, ISSN: 1045-9227, DOI: 10.1109/TNN.2007.905839.

* cited by examiner

NEURAL SYSTEM OF ADAPTIVE BEHAVIOR

BACKGROUND

1. Field

Certain aspects of the present disclosure generally relate to neural networks and, more particularly, to modeling adaptive behavior in a neural system using neuromodulation.

2. Background

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type of artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

SUMMARY

Certain aspects of the present disclosure generally relate to providing, implementing, and using a system based on the neural mechanisms of adaptive behavior. The system may be based on neuromodulator-mediated meta-plasticity and/or gain control. With this system, flexible associations between sensory cues and motor actions are generated, which enable an agent to efficiently gather rewards in a changing environment.

Certain aspects of the present disclosure provide a method for generating neural adaptive behavior. The method generally includes receiving one or more input stimuli; processing the received input stimuli to generate an output signal, wherein the processing is modulated with a first neuromodulation signal generated by a gain control unit; controlling the gain control unit to switch between at least two different neural activity modes, wherein at least one of a level or timing of the first neuromodulation signal generated by the gain control unit is determined based on the neural activity modes; and sending the output signal to an output unit.

Certain aspects of the present disclosure provide an apparatus for generating neural adaptive behavior. The apparatus generally includes a processing system configured to receive one or more input stimuli; to process the received input stimuli to generate an output signal, wherein the processing is modulated with a first neuromodulation signal generated by a gain control unit; to control the gain control unit to switch between at least two different neural activity modes, wherein at least one of a level or timing of the first neuromodulation signal generated by the gain control unit is determined based on the neural activity modes; and to send the output signal to an output unit.

Certain aspects of the present disclosure provide an apparatus for generating neural adaptive behavior. The apparatus generally includes means for receiving one or more input stimuli; means for processing the received input stimuli to generate an output signal, wherein the means for processing is modulated with a first neuromodulation signal generated by a gain control unit; means for controlling the gain control unit to switch between at least two different neural activity modes, wherein at least one of a level or timing of the first neuromodulation signal generated by the gain control unit is determined based on the neural activity modes; and means for sending the output signal to an output unit.

Certain aspects of the present disclosure provide a computer program product for generating neural adaptive behavior. The computer program product generally includes a computer-readable medium having instructions executable to receive one or more input stimuli; to process the received input stimuli to generate an output signal, wherein the processing is modulated with a first neuromodulation signal generated by a gain control unit; to control the gain control unit to switch between at least two different neural activity modes, wherein at least one of a level or timing of the first neuromodulation signal generated by the gain control unit is determined based on the neural activity modes; and to send the output signal to an output unit.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
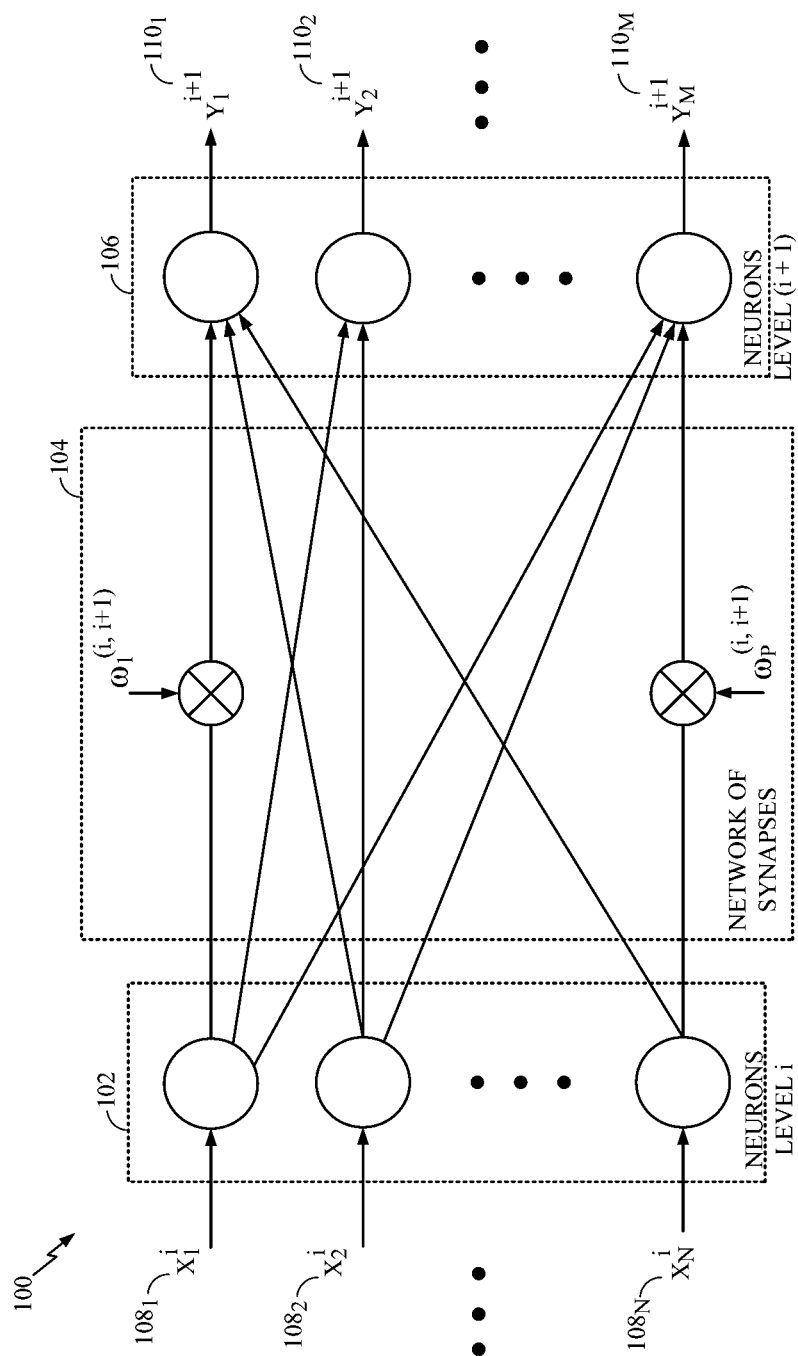
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level 102 of neurons connected to another level 106 of neurons though a network of synaptic connections (synapses 104). For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated in software or in hardware (e.g., by an electrical circuit) and utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

Example Neural System of Adaptive Behavior

To survive in a changing environment, animals must be able to adapt and gather rewards efficiently. Such efficient behavior involves, first, the rapid development of an optimal decision-making strategy when confronted with multiple potential courses of action, and second, rapid modifications to the decision-making strategy in response to environmental changes.

As used herein, a decision-making strategy generally refers to the employment of particular motor actions or non-motor decisions in response to sensory cues from the environment. The sensory cues predict the availability of (a perhaps limited number of) rewards contingent on the performance of some (perhaps unknown) action or decision.

Certain aspects of the present disclosure are based on neurophysiological studies in mammalian species that focused on key brain regions known to support adaptive behavior. When animals are exposed to a new environment without any prior knowledge, animals tend to explore their surroundings in a way that appears random. Through feedback from the environment in the form of reward or punishment, animals are able to learn the implicit reward contingencies between particular sensory cues and the exploratory motor actions. As a result, the animal begins to develop an optimal decision-making strategy that exploits the sensorimotor association that leads to the greatest reward in order to maximize rewards while minimizing punishment. Once the environment has been explored, and if the environment stays relatively stable, animals tend to make reward-exploitative decisions based on the acquired knowledge. These two distinct behaviors are also referred to as "exploration" and "exploitation," or collectively as "foraging behavior."

This strategy not only avoids punishments; it also conserves energy by focusing on the most rewarded sensorimotor association. In a food foraging situation, animals learn how to find food through exploration, but explorations consume more energy. Therefore, as soon as a sufficient food source has been found, animals will exploit the same option in an effort to conserve energy until new exploratory behavior is demanded when the food source has been sufficiently exploited.

In a laboratory setting, this scenario has been investigated using an alternative forced choice (AFC) task in which there are two potential motor plans (e.g., two buttons that can be pressed). At a given time, one motor action is rewarded more than the other, and the animal learns to associate an instructive cue with the rewarded movement. At some point the rewarded motor plan is changed, forcing the subject to reverse the sensorimotor association. This form of learning in response to reversals in reward contingencies is termed reversal learning. Notably, successful reversal learning depends on the orbitofrontal cortex (OFC). If the OFC is damaged or selectively deactivated, reversal learning is impaired and subjects make "perseverative errors." Certain aspects of the present disclosure provide a model of this function of the OFC.

Certain aspects of the present disclosure provide a system based on the neural mechanisms of adaptive behavior, with particular emphasis on the mammalian neuromodulatory system. Methods for flexible associations between sensory cues and motor actions that enable an agent to efficiently gather rewards in a changing environment are described herein. First, new sensorimotor associations are formed quickly when there is no previous knowledge of rewarding sensorimotor associations. Second, once a new sensorimotor association is learned, it is exploited to the relative exclusion of other actions. Third, when that reward source has been sufficiently depleted, or when the sensorimotor association is no longer rewarding for some reason, the agent may quickly switch to exploration mode to discover new rewarding behavioral strategies, and the learned association is diminished. The exploration and exploitation modes on the behavioral level are subserved by different modes of neural activity mediated by neuromodulators at the synaptic level. The reward contingencies are learned through reward-mediated plasticity.

Certain aspects of the present disclosure may be implemented using a spiking neural network. Other aspects may be implemented using a non-spiking neural network as an alternative.

Figure 2:
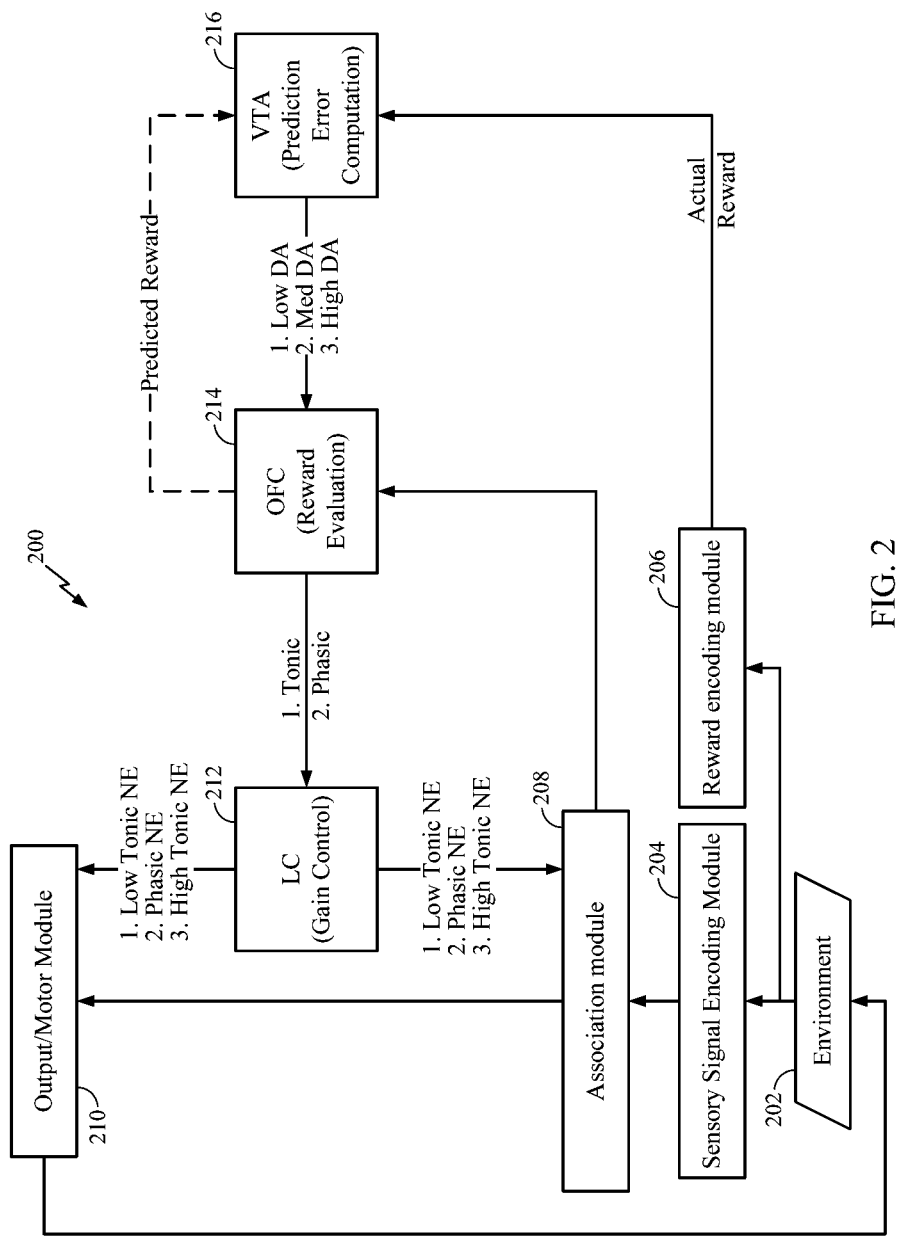
FIG. 2 is a block diagram of an example system based on neural mechanisms of adaptive behavior, in accordance with certain aspects of the present disclosure.

FIG. 2 illustrates an example system 200 based on neural mechanisms of adaptive behavior, in accordance with certain aspects of the present disclosure. The system 200 represents the environment 202 and also includes a sensory signal encoding module 204, a reward encoding module 206, an association module 208, an output/motor module 210, a gain control module 212 (modeling the locus coeruleus (LC), for example), a reward evaluation module 214 (modeling the orbito-frontal cortex (OFC), for example), and a prediction error computation module 216 (modeling the ventral tegmental area (VTA), for example). Any combination of the modules (i.e., units or layers) in the system 200 may be implemented in hardware and/or software.

Certain aspects of the present disclosure model the adaptive behavior mediated by the norepinephrine (NE) and dopamine (DA) neuromodulatory systems. This includes: how NE from the LC (represented by the gain control module 212) modulates gains in information transmission, how DA from the VTA (represented by the prediction error computation module 216) modulates the learning rule, how the OFC (represented by the reward evaluation module 214) is affected by the learning rule, and how the LC drives the switch between exploration and exploitation modes. While the present disclosure describes neuromodulation via NE and DA, other neuromodulators may be substituted for or supplement NE and/or DA in the system 200.

Environmental Interaction

The sensory signal encoding module 204, association module 208, and output/motor module 210 are used as the system's input and output interface to interact with the environment 202. Individual modules in this system 200 are described in more detail below.

Environment Module:

This module, which may be considered as external to the modeled system 200, represents anything outside of the system that may send inputs to the system. These inputs may include environmental state inputs, sensory inputs, and reward inputs, for example. In return, the system's motor output acts upon the environment 202 and may cause environment state change.

Sensory Signal Encoding Module:

In this module, input stimuli are converted into neuron representations, such as spikes. If the system 200 is a visual system, the sensory signal encoding module 204 may be considered as retinal ganglion cells. Similarly, if the system 200 is an auditory system, this module may be considered as a layer of spiral ganglion cells.

Reward Encoding Module:

The reward encoding module 206 encodes the environmental reward, such as food, into neural representations. These neural representations of the actual reward may be compared with a predicted reward in the prediction error computation module 216.

Association Module:

In this module, information from the sensory signal encoding module 204 is further processed into symbolic representation. For example, in a visual system, this may be considered as the ventral stream where information flows from V1→V4→IT (i.e., primary visual cortex (also known as striate cortex or V1) to the extrastriate visual cortex area four (V4) in the ventral stream to the inferior temporal cortex (IT)) for feature extraction and progressively build up into visual symbolic representation in IT. Similarly, in an auditory system, the association module 208 may be considered as a chain of cochlear cells and cochlear nucleus cells etc. At the output of this module, different groups of excitatory neurons represent different stimulus classes. Typically, the association module 208 has some inhibitory interneurons that are connected from excitatory neurons and send inhibitory feedback to the excitatory group to create a winner-take-all competition or a soft-winner-take-all competition.

Output/Motor Module:

The information from the association module 208 is sent to the output/motor module 210. If the signal is efficiently transmitted, it will drive the output/motor module 210 strongly enough to trigger responses, and the encoded motor actions will be executed. The specific mapping of the association module 208 to the output/motor module 210 is subject to reward-based plasticity.

Gain Control (Locus Coeruleus) Module

Figure 3:
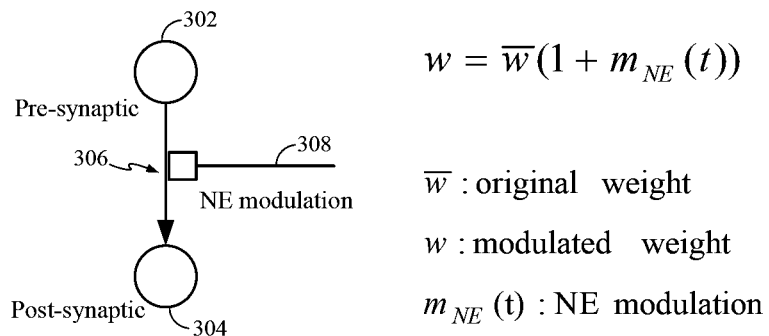
FIG. 3 illustrates example norepinephrine (NE) modulation, in accordance with certain aspects of the present disclosure.

In the mammalian neuromodulatory system, it has been found that the locus coeruleus (LC) is a brain region that releases norepinephrine (NE) as a neurotransmitter to other brain areas. In the presence of NE, the neurons of NE-modulated areas exhibit increased synaptic transmission efficacies. One implementation of such increased efficacies is by changing the synaptic weights, as shown in FIG. 3. In FIG. 3, the synapse 306 between a pre-synaptic neuron 302 and a post-synaptic neuron 304 is modulated at 308 using NE. The NE modulation ($m_{NE}(t)$) at 308 is used to adjust the original weight ($\overline{w}$) of the synapse 306 to yield a modulated synaptic weight (w). In other words, the NE modulates the scale (i.e., the gain).

Figure 4:
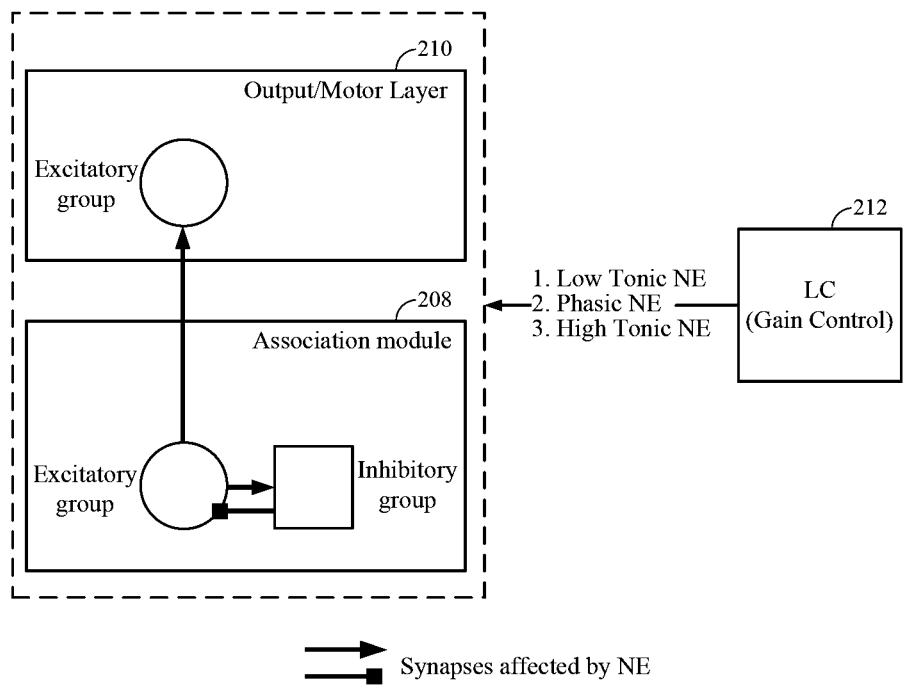
FIG. 4 illustrates three neural activity modes output by the gain control module in the system of FIG. 2, in accordance with certain aspects of the present disclosure.

Three modes of neural activities determine the overall level of NE signals: low tonic, phasic, and high tonic. Accordingly, different motor behaviors are modulated by the three modes of LC activities. The modulatory NE signal is generated by LC neurons and is used to regulate the network dynamics in the path from the association module 208 to the output/motor module 210, as shown in FIG. 4. This modulatory system, in addition to increasing or decreasing the transmission efficiency of the signal, when in low tonic mode, may also stop the signal from being sent altogether (i.e., no spikes from the association module 208 to the output/motor module 210). In this manner, the LC functions as a gating mechanism, permitting or preventing signals from being sent to the output/motor module 210.

Figure 5A:
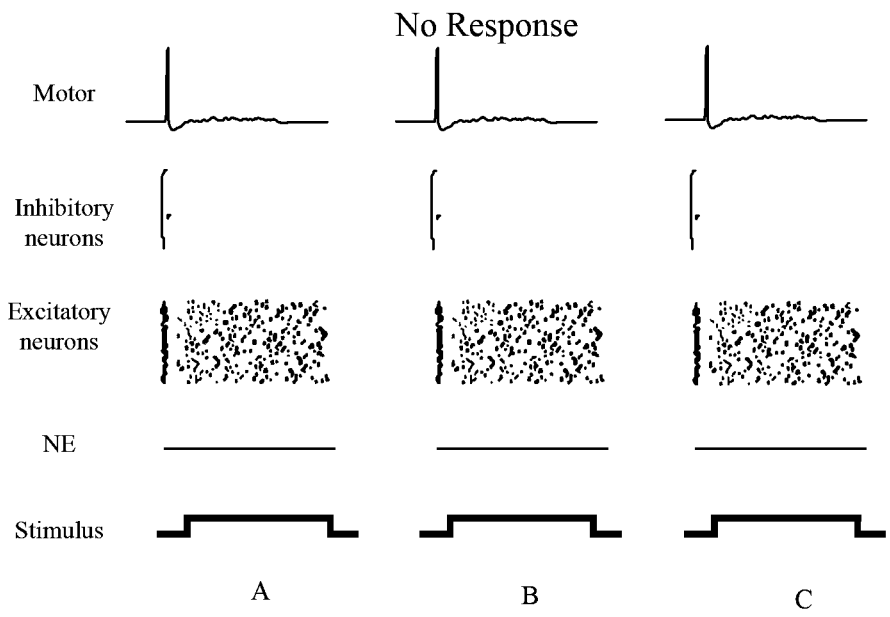
FIG. 5A illustrates example system behavior based on low tonic mode for the gain control module, in accordance with certain aspects of the present disclosure.

The low tonic firing mode corresponds to periods when the animal is sleepy and drowsy. For certain aspects, the low tonic firing mode restricts the efficacy of association layer neurons to drive motor neurons in the output module 210. The information path is effectively shut off, and the output/motor module 210 is not responsive to any input (e.g., to any of stimulus A, B, or C), as illustrated in FIG. 5A. FIG. 5A illustrates a low NE level and only one spike during each of the three stimuli shown.

Figure 5B:
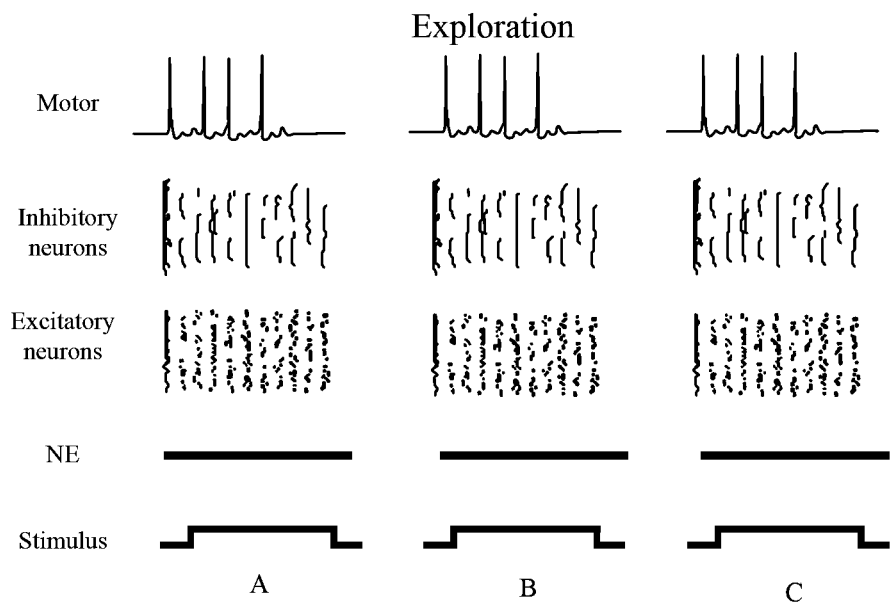
FIG. 5B illustrates example system behavior based on high tonic mode for the gain control module, in accordance with certain aspects of the present disclosure.

The high tonic mode corresponds to when the animal is in the exploration mode, in which the animal is active and easy to be distracted. For certain aspects, the high tonic mode indiscriminately enhances the efficacy of the association module 208 to drive the output/motor module 210, and the system will respond to any input (e.g., to all of stimuli A, B, and C), as shown in FIG. 5B. FIG. 5B illustrates a high NE level and four spikes during each of the three stimuli shown.

Figure 5C:
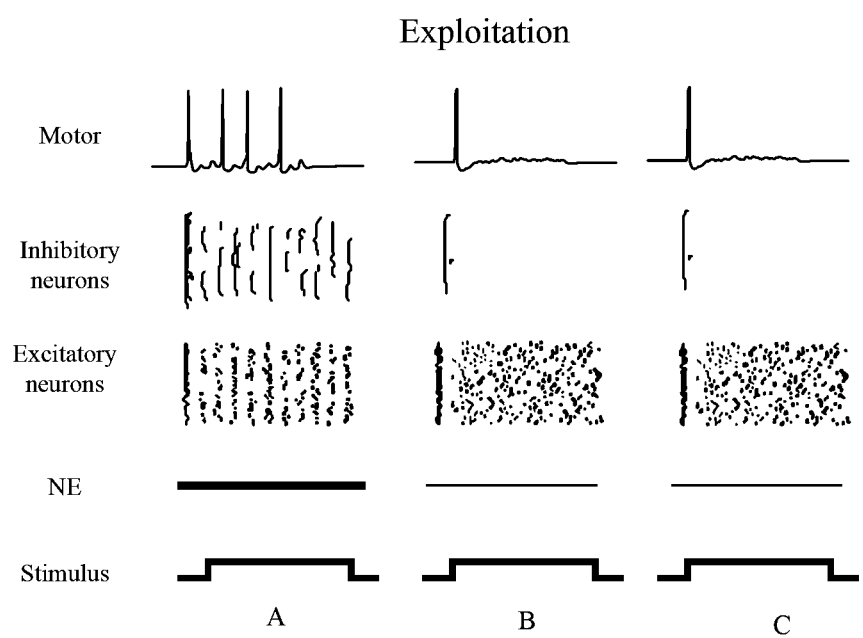
FIG. 5C illustrates example system behavior based on phasic mode for the gain control module, in accordance with certain aspects of the present disclosure.

Finally, the phasic mode corresponds to when the animal is in the exploitation mode. For certain aspects, the phasic mode will increase the efficacy of only one sensorimotor association out of many, effectively focusing the system to only respond to a task-specific, rewarding input, as shown in FIG. 5C. FIG. 5C illustrates a stronger response to stimulus A (i.e., four spikes and high NE level) than to either stimulus B or C (only one spike per stimulus and a low NE level).

Reward Evaluation (Orbito-Frontal Cortex) Module

In general, the phasic and tonic modes of LC neurons correlate with periods of exploitation and exploration, respectively. However, a critical question remains as to what determines when the LC should transition between the two modes of behavior.

A growing body of evidence suggests that the OFC plays critical roles in evaluating rewards. For example, see Roesch M. R., and C. R. Olson, "Neuronal Activity Related to Reward Value and Motivation in Primate Frontal Cortex," *Science* 304:307-10 (2004); Wallis, J. E. and E. K. Miller, "Neuronal activity in primate dorsolateral and orbital prefrontal cortex during performance of a reward preference task," *Eur. J. Neurosci.* 18(7):2069-81 (2003); and Campos, M., et al., "Orbitofrontal cortical activity during repeated free choice," *J Neurophysiol.* 107:12:3246-55 (2012). Also, anatomic studies of afferents to the LC have shown that the OFC sends strong convergent projections to the LC. For example, see Aston-Jones, G., et al., "Prominent projections from the orbital prefrontal cortex to the locus coeruleus in monkey," *Soc. Neurosci. Abstr.* 28:86-9 (2002) and Zhu, Y., et al. "Projection from the orbitofrontal cortex to the locus coeruleus in monkeys revealed by anterograde tracing," *Soc. Neurosci. Abstr.* 30:211.3 (2004). Therefore, the reward evaluation module 214 emulates the orbito-frontal cortex (OFC) in an effort to drive the selection between the tonic and phasic modes of LC firing activity.

Figure 6:
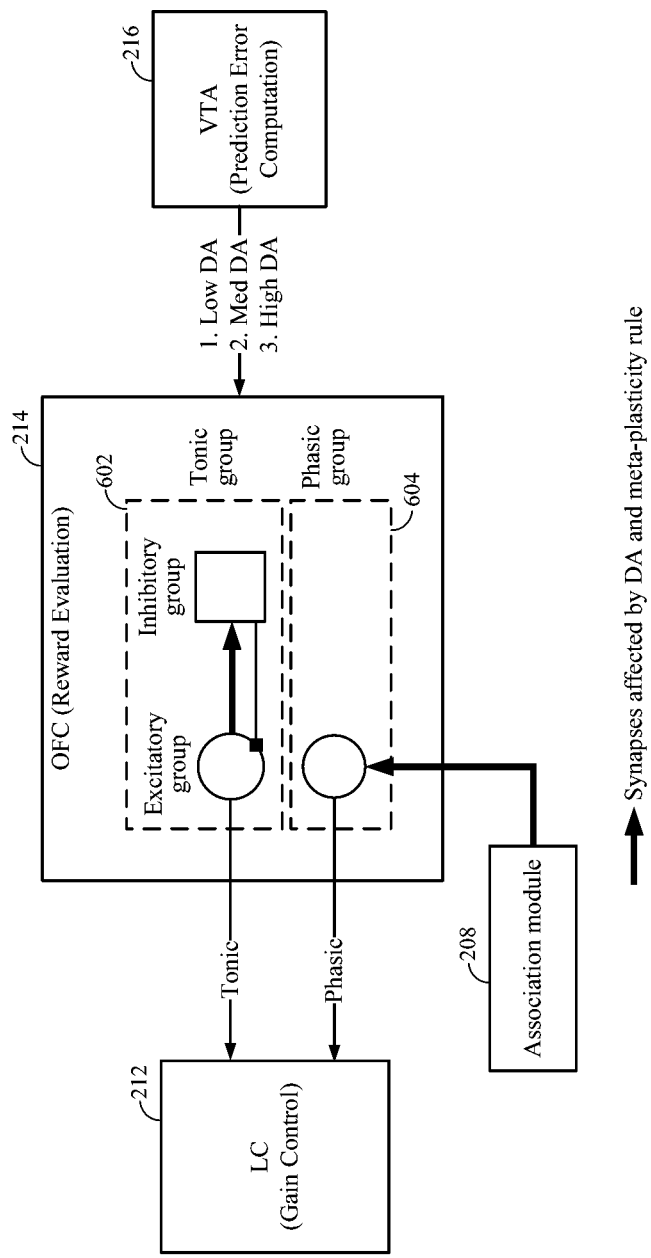
FIG. 6 illustrates phasic and tonic neuron groups in the reward evaluation module in the system of FIG. 2, in accordance with certain aspects of the present disclosure.

In this system 200, two groups of neurons are used in the reward evaluation module 214, which are referred to as the tonic group 602 and the phasic group 604, as shown in FIG. 6. The phasic group 604 may receive inputs from the association module 208, whereas the tonic group 602 may receive no external inputs. The tonic group 602 may be composed of excitatory neuron and inhibitory neurons mutually connected with each other. The excitatory neurons in the tonic group 602 have spontaneously firing activities, which are independent of the presented input. Both phasic neurons and excitatory tonic neurons can drive LC neurons.

The synapses between the association module 208 and the phasic OFC neurons map the inputs to an OFC response, and this mapping essentially evaluates how much reward value can come from the current inputs. If the reward value is high, in the sense that the current inputs can trigger a phasic OFC response, phasic OFC neurons (i.e., neurons in the phasic group 604) may drive LC neurons to open the path from the association module 208 to the output/motor module 210. On the other hand, if the reward value is low, LC neurons may not have phasic responses to let the output/motor module 210 respond to the current inputs.

Meanwhile, the synapses between the tonic excitatory OFC neurons and tonic inhibitory OFC neurons determine the extent to which tonic activities are going to drive the LC neurons. When this synapse group is not strong enough, the spontaneous activities from tonic OFC neurons (i.e., neurons in the tonic group 602) may be able to send tonic stimulus to the LC. Accordingly, the LC tonic activities may open the path from the association module 208 to the output/motor module 210 such that output responses are generated. However, when this synapse group is strong, the excitatory tonic OFC neurons may be inhibited by inhibitory tonic OFC neurons, so the excitatory neurons may not drive the LC.

These synapses are adaptive and receive additional neurotransmitter input via dopamine (DA). DA is released from the prediction error computation module 216. The DA release (in high, medium, and low levels) strengthens or weakens these synapses based on the meta-plasticity rule, which respectively pushes the OFC to drive the LC into the phasic or tonic mode. More detailed description can be found in the meta-plasticity section below.

Prediction Error (Ventral Tegmental Area (VTA)) Module

It has also been found that as another type of neuromodulatory system, the ventral tegmental area (VTA) is a brain region that responds to the reward received from the environment, and releases dopamine (DA) as a neurotransmitter accordingly to other brain areas, as discussed in Schultz, W., et al. "A Neural Substrate of Prediction and Reward," *Science* 275:1593-1598 (1997). The VTA neuron activities are thought to reflect the difference between the predicted value and the actual reward received from the environment.

For certain aspects of the present disclosure, VTA neurons (neurons modeled as the prediction error computation module 216) receive inputs from OFC neurons (neurons modeled as the reward evaluation module 214) as the predicted reward and receive inputs from the reward encoding module 206 as the actual environmental reward. The difference between these two reward values sets the level of VTA DA signal input to the OFC (i.e., the reward evaluation module 214). When the actual reward is higher than the expected value (i.e., the predicted reward), VTA neurons generate activities higher than their baseline, resulting in a high DA level. When the actual reward is lower than expected, VTA neurons have activities lower than their baseline, resulting in a low DA level. When the expected value matches the actual reward, VTA neurons output a medium DA level.

Algorithms in the prediction error computation module 216 are used to learn the predicted reward. For certain aspects, the predicted reward may be determined by a temporal difference (TD) learning algorithm, which uses changes (or differences) in predictions over successive time increments to drive the learning method. The TD learning algorithm updates the prediction at any given time increment to bring it closer to the prediction of the same quantity at the next time increment.

Meta-Plasticity Rule

The classic spike-timing-dependent-plasticity (STDP) rule relies solely on the spike timing difference between pre- and post-synaptic neurons. However, experimental evidence indicates that there are cases when timing alone is not sufficient in deciding synaptic plasticity rules. The data in Pawlak, V. et al., "Timing is not everything: neuromodulation opens the STDP gate," *Front. Synaptic Neurosci.* 2:1-13 (2010) indicates that synaptic plasticity is gated by modulatory signal DA. The sign of plasticity change is also affected by the state and concentration of combination of neurotransmitters and receptors, as described in Shen, W. et al., "Dichotomous Dopaminergic Control of Striatal Synaptic Plasticity," *Science* 321: 848-850 (2008). The present disclosure introduces a meta-plasticity rule, where meta-plasticity generally refers to a change in the capacity to provoke subsequent synaptic plasticity, including long-term potentiation (LTP) and long-term depression (LTD). As a generalized synaptic plasticity rule, the meta-plasticity rule disclosed herein links the neuromodulation input, which possibly comes with delay, with the pre- and post-synaptic neuron activities.

The pre- and post-synaptic neuron activities result in eligibility traces similar to the scheme in Izhikevich, E. M., "Solving the Distal Reward Problem through Linkage of STDP and Dopamine Signaling," *Cerebral Cortex* 17:2443-52 (2007). But with the meta-plasticity rule, the potentiation p(t) and depression d(t) traces are separately expressed in Eq. (1) below, where the eligibility traces decay over time:

$$p(t) = p(t-1) - \frac{p(t-1)}{\tau_{trace}} + LTP(\tau)\delta(t - t_{pre/post}) \quad (1)$$

$$d(t) = d(t-1) - \frac{d(t-1)}{\tau_{trace}} + LTD(\tau)\delta(t - t_{pre/post})$$

where $\tau_{trace}$ is the time constant of the trace. The synaptic change may be represented as $$\Delta s(t) = \Delta w \cdot p(t) + \Delta w \cdot d(t). \quad (2)$$

Figure 7:
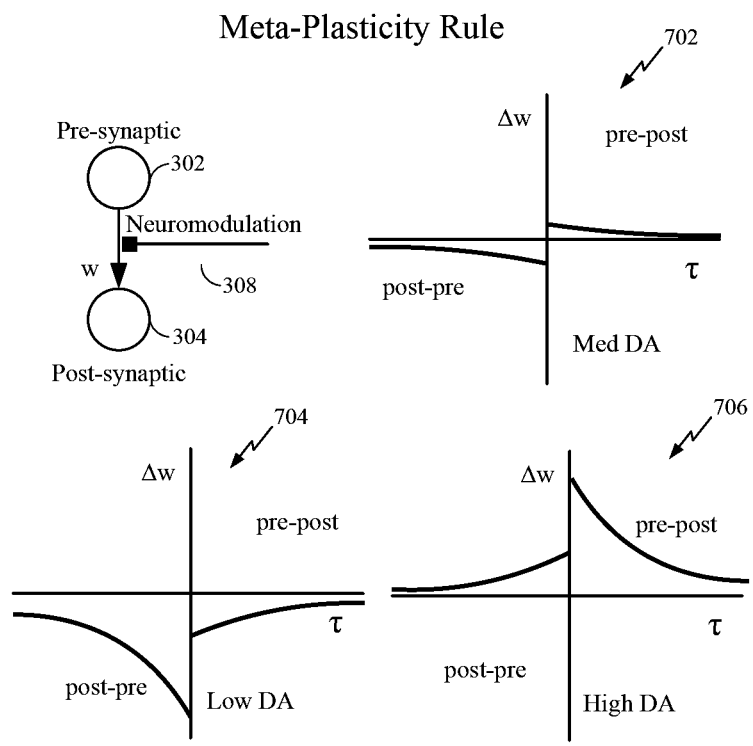
FIG. 7 graphically illustrates an example meta-plasticity rule stipulating three different modes depending on the level of neuromodulatory inputs, in accordance with certain aspects of the present disclosure.

In general, the proposed meta-plasticity rule stipulates three neural activity modes depending on the level of neuromodulatory inputs, as illustrated in FIG. 7. A high DA level yields $\Delta w > 0$. As illustrated in the graph 706 of FIG. 7, this modulates the learning rule into a Hebbian regime where positive $\Delta s(t)$ is applied to both pre-post and post-pre synaptic firing events, which leads to the strengthening of the synapse.

A low DA level yields $\Delta w < 0$. As illustrated in the graph 704 of FIG. 7, this modulates the learning rule into an anti-Hebbian regime, where negative $\Delta s(t)$ is applied to both pre-post and post-pre synaptic firing events to weaken the synapse. Although the graphs 704 and 706 illustrate piecewise exponential functions, other functions (e.g., a square wave or piecewise rectangular functions) may be used instead for certain aspects.

A medium DA level induces little synaptic weight change, so $\Delta w \sim 0$, $\Delta s \sim 0$. The graph 702 of FIG. 7 illustrates this nominal synaptic change for both pre-post and post-pre synaptic firing events for certain aspects. For other aspects, a flat, horizontal line (representing no updates) could be used instead for the medium DA level, rather than a piecewise exponential function (representing small updates), as illustrated in the graph 702.

The meta-plasticity rule stipulates that a high DA level from the VTA (the prediction error computation module 216) will enable synaptic potentiation, such that the system 200 remembers the association. On the contrary, a low DA level from the VTA will result in synaptic depression, such that the system 200 actively forgets the current association quickly. Such a meta-plasticity rule is important in reward-learning, especially a reversal learning scheme. Prior learning systems use a passive decay mechanism to forget an association, which takes significantly longer than the active mechanism disclosed herein for forgetting an association (i.e., for reversal learning). However, the active forgetting of the association need not be immediate; there may be some stability built in to the forgetting scheme, as described in the present disclosure.

This meta-plasticity learning rule is not limited to networks of spiking neurons. In a rate-based neural network, the eligibility traces are calculated using correlation between neuron responses, and the same rule applies to link the eligibility traces with the neuromodulation inputs.

Figure 8A:
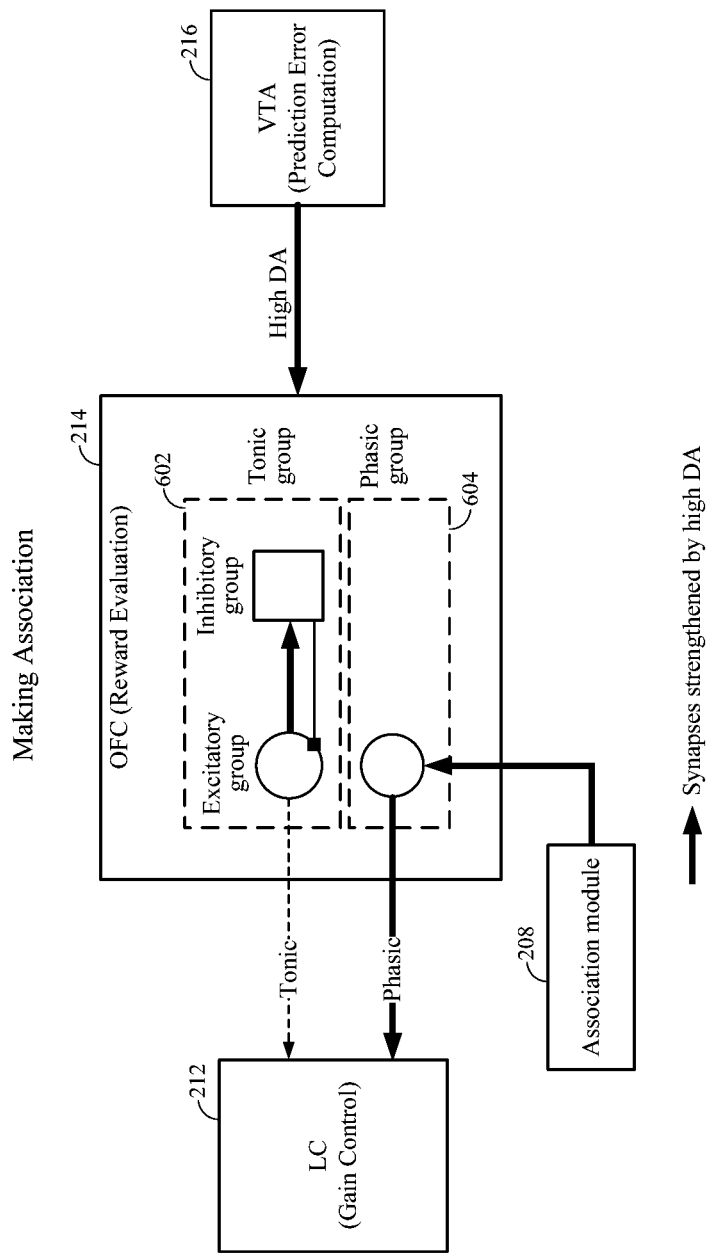
FIG. 8A illustrates a high dopamine (DA) level inducing update of the reward evaluation module and a phasic response for the gain control module, in accordance with certain aspects of the present disclosure.

Using this learning rule, when the system explores to an action that leads to reward, which is unexpected, the high DA signal will strengthen the connections between the rewarded inputs to the OFC phasic neurons. The high DA signal also strengthens the synapses between the excitatory tonic group and the inhibitory tonic group. After learning, the OFC tonic neurons may be inhibited and may not drive LC tonic activities any more, while the OFC phasic neurons may be excited and may drive LC phasic activities to let the output/motor module 210 respond to the same input specifically, as shown in FIG. 8A. Therefore, the system is switched into the exploitation mode.

Figure 8B:
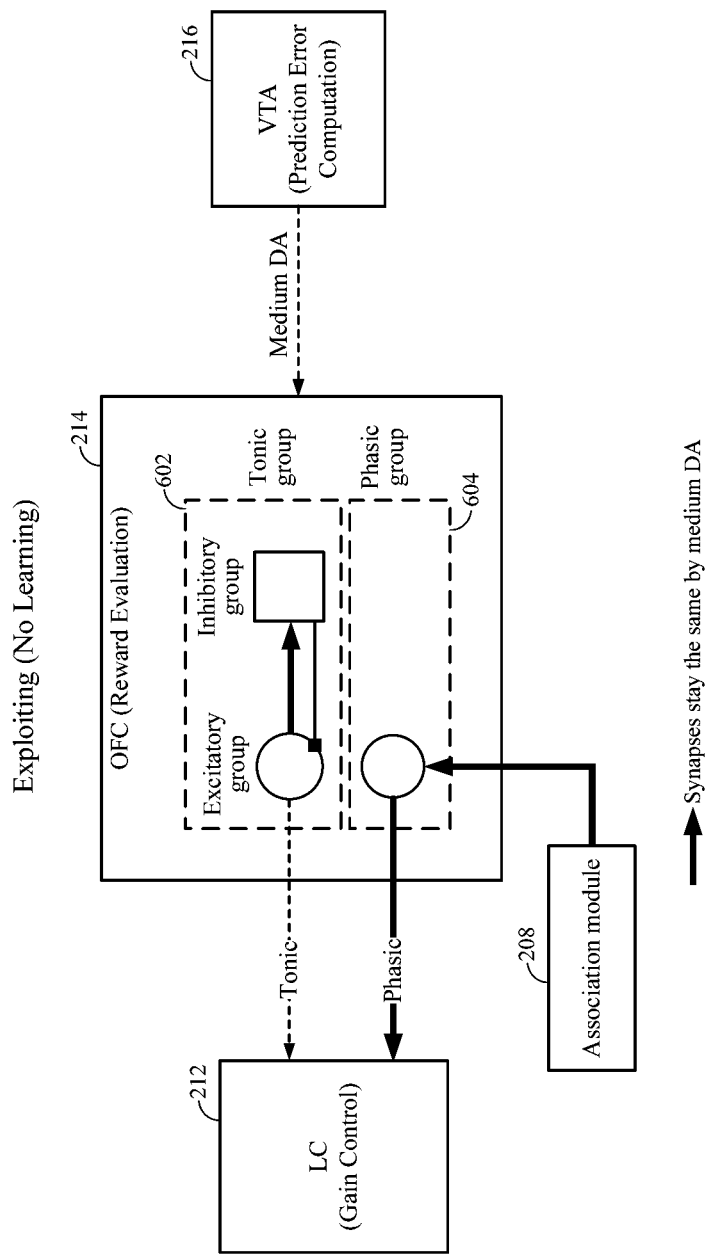
FIG. 8B illustrates a medium DA level inducing no further update of the reward evaluation module, in accordance with certain aspects of the present disclosure.

After this, as the OFC (the reward evaluation module 214) has been updated and expects to see a reward for this specific input, the VTA (the prediction error computation module 216) will generate a medium DA level. The two groups of synapses may not change as long as the expected reward takes place. The OFC may continue driving the LC (the gain control module 212) with phasic activities, and the system 200 stays in exploitation mode, as shown in FIG. 8B. FIG. 8B represents the status quo.

Figure 8C:
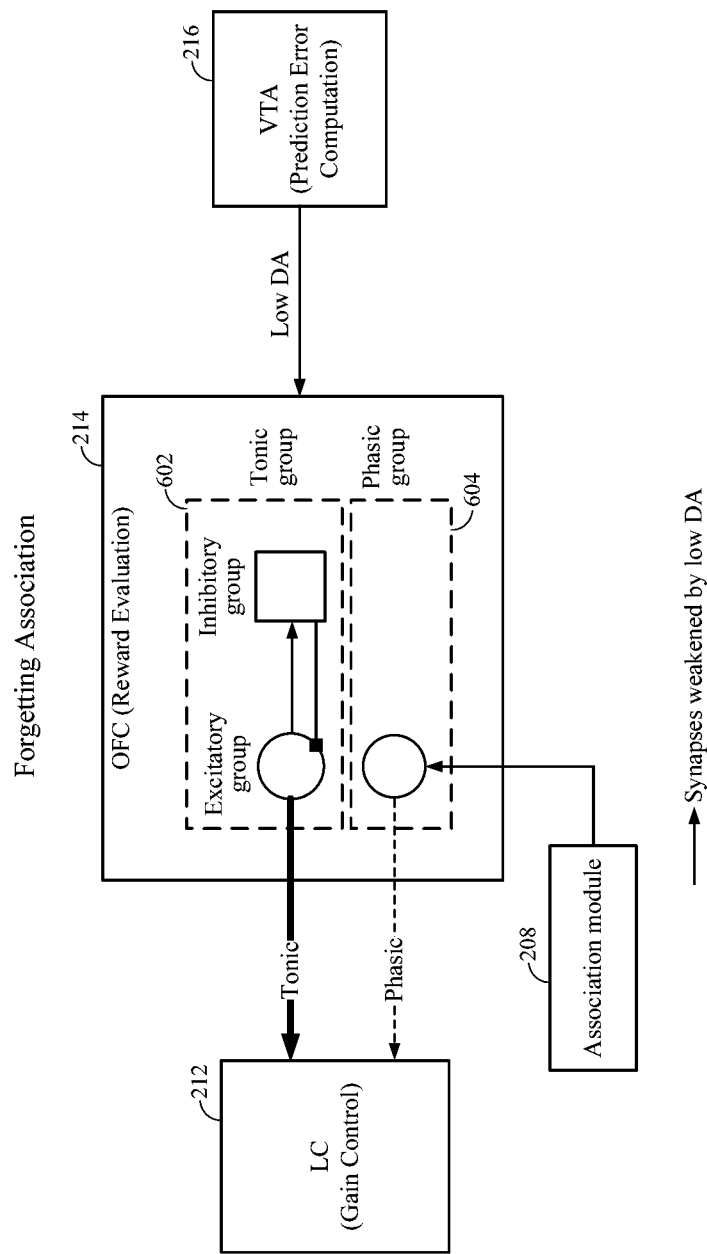
FIG. 8C illustrates a low DA level inducing update of the reward evaluation module and a tonic response for the gain control module, in accordance with certain aspects of the present disclosure.

However, when the reward is suddenly taken away from this input, the mismatch in the expected reward versus the actual reward will generate a low DA signal from the VTA, thereby weakening the previously strengthened synapses to induce reversal learning. After this, OFC tonic neurons may actively drive the LC tonic activities, while OFC phasic neuron may not, as shown in FIG. 8C. The output/motor module 210 may respond to any input, and the system 200 may be switched to the exploration mode to acquire a new reward contingency. In this manner, the DA modulates the synaptic rule weight (i.e., the learning rule).

Therefore, the DA-dependent meta-plasticity rule disclosed herein enables (1) the quick association between sensory inputs and reward; and (2) the quick disassociation during reversal learning of sensory inputs and the obsolete reward. Compared to the previous reward learning scheme in Izhikevich, aspects of the present disclosure adapt to the change in the reward signal faster. The DA-dependent meta-plasticity also mediates the behavioral switch between exploration and exploitation by changing the reward evaluation module 214 that drives the gain control module 212 in either phasic or tonic mode. Therefore, the behavioral switch is dependent on how well the reward evaluation module 214 can predict rewards. Energy consumption-wise, the learning rule disclosed herein is more efficient, because the system will not waste energy to keep exploring the environment once the reward contingency is learned or to continue exploiting the obsolete reward contingency.

Secondly, NE modulation can quickly control the gain in motor association. The system 200 thus possesses the flexible dynamics without using synapse plasticity. Although synapse plasticity can accomplish a similar effect of gain change, it takes time for training and cannot be easily switched back. The NE system enables the system 200 to explore options soon after the reward contingencies have changed.

Similarly, as soon as a new reward contingency is established, switching to the exploitation mode in the system 200 enables the system to maximize the reward while minimizing the consumed energy. Again, energy consumption-wise, aspects of the present disclosure are more efficient.

Finally, the designed system is highly biologically plausible. The signals inside the system 200 (including sensory coding, motor output, and reward coding) may all be represented as neural activities, such as spikes. This allows implementation in a distributed computing platform. The system has been implemented as a spiking neuron network, and it has been shown that this scheme is scalable to multiple input choices. However, all the elements in this scheme apply to rate-based neural systems, as well.

Example Operations

Figure 9:
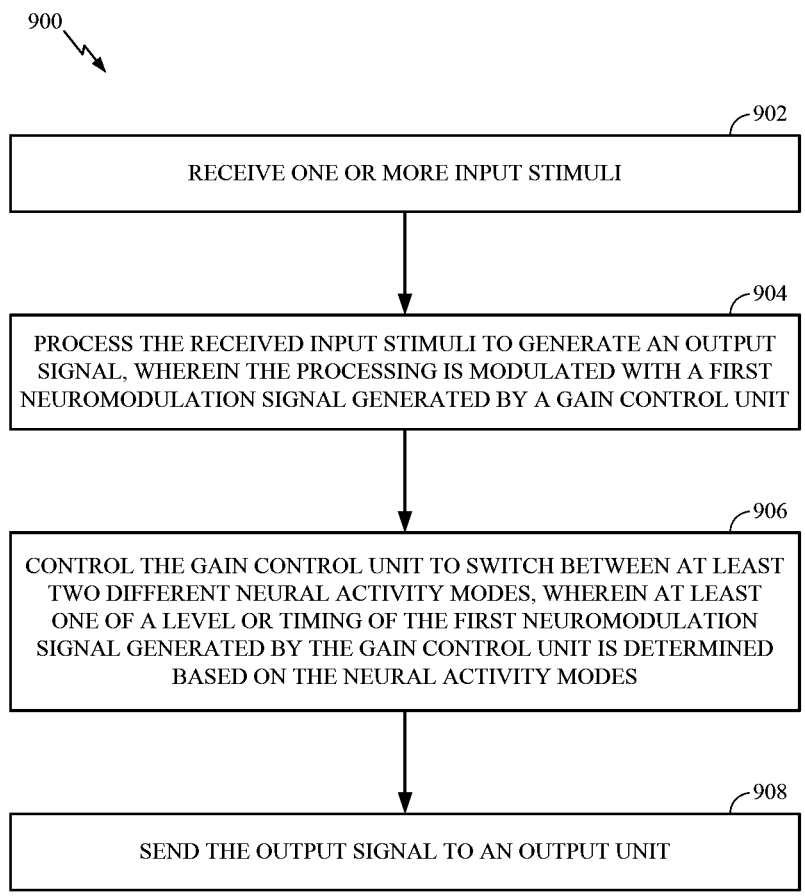
FIG. 9 is a flow diagram of example operations for generating neural adaptive behavior, in accordance with certain aspects of the present disclosure.

FIG. 9 is a flow diagram of example operations 900 for generating neural adaptive behavior, in accordance with certain aspects of the present disclosure. The operations 900 may be performed in hardware (e.g., by a processing system comprising one or more processing units), in software, or in firmware.

The operations 900 may begin, at 902, by receiving one or more input stimuli. At 904, the received input stimuli may be processed in an effort to generate an output signal. The processing at 904 is modulated with a first neuromodulation signal generated by a gain control unit. For certain aspects, the first neuromodulation signal comprises a norepinephrine (NE) signal. According to certain aspects, the gain control unit is modeled on behavior of a locus coeruleus (LC).

At 906, the gain control unit may be controlled to switch between at least two different neural activity modes. At least one of a level or timing of the first neuromodulation signal (generated by gain control unit) is determined based on the neural activity modes. According to certain aspects, the at least two different neural activity modes comprise a tonic mode and a phasic mode. The tonic mode may be associated with periods of exploration, and the phasic mode may be associated with periods of exploitation.

According to certain aspects, the gain control unit may be controlled at 906 with a reward evaluation unit. The reward evaluation unit may be modeled on behavior of an orbitofrontal cortex. For certain aspects, the at least two different neural activity modes include a tonic mode and a phasic mode. In this case, the reward evaluation unit may include a phasic neuron group for driving the phasic mode of the gain control unit and a tonic neuron group for driving the tonic mode of the gain control unit. The tonic neuron group may include an excitatory neuron group and an inhibitory neuron group.

According to certain aspects, the operations 900 further include determining an actual reward (e.g., as provided by the environment 202), determining a predicted reward (e.g., based on at least one of the received input stimuli), and modulating synaptic plasticity of the phasic neuron group or the tonic neuron group based on a difference between the predicted reward and the actual reward. Determining the predicted reward may include using a temporal difference (TD) learning algorithm. For certain aspects, the modulating includes outputting a second neuromodulation signal to the reward evaluation unit. A level of the second neuromodulation signal may be based on the difference between the predicted reward and the actual reward. The second neuromodulation may comprise a dopamine (DA) signal, for example. For certain aspects, a high level of the second neuromodulation signal enables synaptic potentiation to remember an association, and a low level of the second neuromodulation signal results in synaptic depression to forget the association. For certain aspects, a high level of the second neuromodulation signal: (1) strengthens synapses between the excitatory neuron group and the inhibitory neuron group of the tonic neuron group, such that the tonic neuron group is inhibited and will not drive the tonic mode of the gain control unit; and (2) strengthens synapses associated with the phasic neuron group, such that the phasic neuron group will drive the phasic mode of the gain control unit. A low level of the second neuromodulation signal may weaken the strengthened synapses both associated with the phasic neuron group and between the excitatory neuron group and the inhibitory neuron group, such that the tonic neuron group will drive the tonic mode of the gain control unit and the phasic neuron group will not drive the phasic mode of the gain control unit.

According to certain aspects, determining the actual and predicted rewards and outputting the DA signal is performed by a prediction error computation unit. The prediction error computation unit may be modeled on behavior of a ventral tegmental area (VTA).

At 908, the output signal may be sent to an output unit. For certain aspects, the output unit is modeled on behavior of a motor neuron. As described above, the gain control unit, in addition to modulating the output signal, may function as a gating mechanism, preventing the output signal from being sent to the output unit altogether.

Figure 9A:
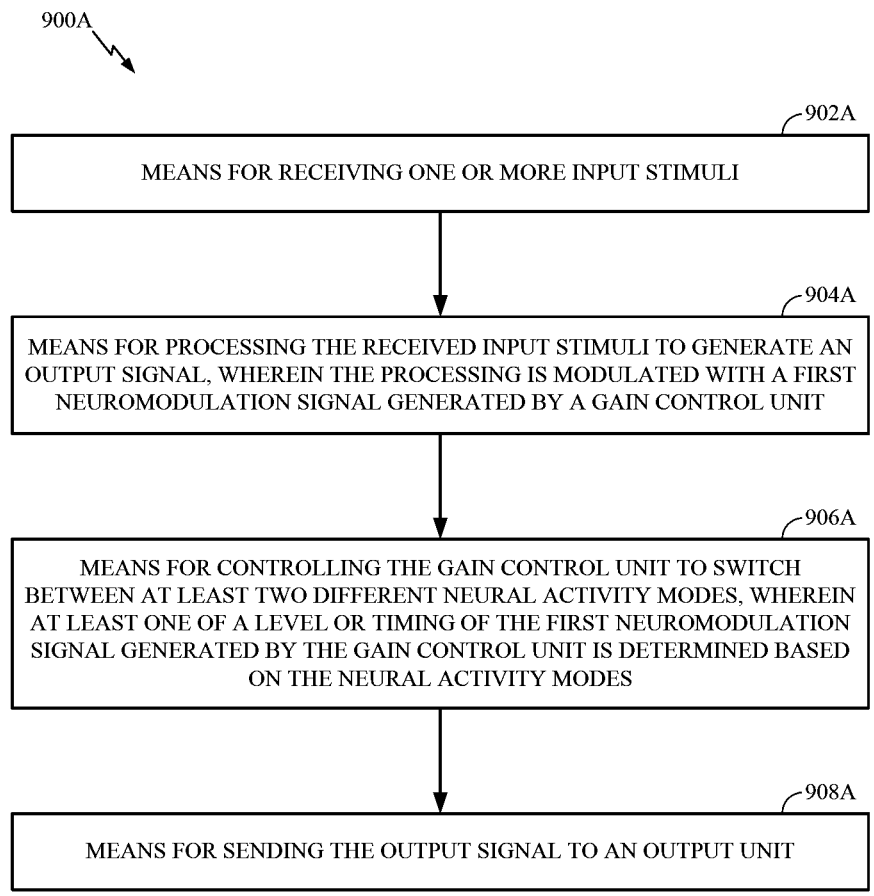
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900A illustrated in FIG. 9A.

For example, the means for displaying may comprise a display (e.g., a monitor, flat screen, touch screen, and the like), a printer, or any other suitable means for outputting data for visual depiction, such as a table, chart, or graph. The means for processing, means for receiving, means for controlling, means for sending, means for modulating, or means for determining may comprise a processing system, which may include one or more processors or processing units. The means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray™ disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for generating neural adaptive behavior, comprising:
    receiving one or more input stimuli;
    processing the received input stimuli to generate an output signal, wherein the processing is modulated with a first neuromodulation signal generated by a gain control unit; and
    controlling the gain control unit to switch between at least two different neural activity modes, wherein at least one of a level or timing of the first neuromodulation signal generated by the gain control unit is determined based on the neural activity modes.

2. The method of claim 1, wherein the gain control unit is modeled on behavior of a locus coeruleus (LC).

3. The method of claim 1, wherein the at least two different neural activity modes comprise a tonic mode and a phasic mode.

4. The method of claim 3, wherein the tonic mode is associated with periods of exploration and wherein the phasic mode is associated with periods of exploitation.

5. The method of claim 1, wherein controlling the gain control unit comprises controlling the gain control unit with a reward evaluation unit.

6. The method of claim 5, wherein the reward evaluation unit is modeled on behavior of an orbito-frontal cortex (OFC).

7. The method of claim 5, wherein the at least two different neural activity modes comprise a tonic mode and a phasic mode and wherein the reward evaluation unit comprises:
    a phasic neuron group for driving the phasic mode of the gain control unit; and
    a tonic neuron group for driving the tonic mode of the gain control unit, wherein the tonic neuron group comprises an excitatory neuron group and an inhibitory neuron group.

8. The method of claim 7, further comprising:
    determining an actual reward;
    determining a predicted reward based on at least one of the received input stimuli; and
    modulating synaptic plasticity of the phasic neuron group or the tonic neuron group based on a difference between the predicted reward and the actual reward.

9. The method of claim 8, wherein determining the predicted reward comprises using a temporal difference (TD) learning algorithm.

10. The method of claim 8, wherein the modulating comprises outputting a second neuromodulation signal to the reward evaluation unit, wherein a level of the second neuromodulation signal is based on the difference between the predicted reward and the actual reward.

11. The method of claim 10, wherein a high level of the second neuromodulation signal enables synaptic potentiation to remember an association and wherein a low level of the second neuromodulation signal results in synaptic depression to forget the association.

12. The method of claim 10, wherein a high level of the second neuromodulation signal:
    strengthens synapses between the excitatory neuron group and the inhibitory neuron group of the tonic neuron group, such that the tonic neuron group is inhibited and will not drive the tonic mode of the gain control unit; and
    strengthens synapses associated with the phasic neuron group, such that the phasic neuron group will drive the phasic mode of the gain control unit.

13. The method of claim 12, wherein a low level of the second neuromodulation signal weakens the strengthened synapses both associated with the phasic neuron group and between the excitatory neuron group and the inhibitory neuron group, such that the tonic neuron group will drive the tonic mode of the gain control unit and the phasic neuron group will not drive the phasic mode of the gain control unit.

14. The method of claim 10, wherein determining the actual and predicted rewards and outputting the second neuromodulation signal is performed by a prediction error computation unit.

15. The method of claim 14, wherein the prediction error computation unit is modeled on behavior of a ventral tegmental area (VTA).

16. The method of claim 10, wherein the second neuromodulation signal comprises a dopamine (DA) signal.

17. The method of claim 1, wherein the first neuromodulation signal comprises a norepinephrine (NE) signal.

18. The method of claim 1, further comprising sending the output signal to an output unit, wherein the output unit is modeled on behavior of a motor neuron.

19. An apparatus for generating neural adaptive behavior, comprising:
a processing system configured to:
receive one or more input stimuli;
process the received input stimuli to generate an output signal, wherein the processing is modulated with a first neuromodulation signal generated by a gain control unit; and
control the gain control unit to switch between at least two different neural activity modes, wherein at least one of a level or timing of the first neuromodulation signal generated by the gain control unit is determined based on the neural activity modes.

20. The apparatus of claim 19, wherein the gain control unit is modeled on behavior of a locus coeruleus (LC).

21. The apparatus of claim 19, wherein the at least two different neural activity modes comprise a tonic mode and a phasic mode.

22. The apparatus of claim 21, wherein the tonic mode is associated with periods of exploration and wherein the phasic mode is associated with periods of exploitation.

23. The apparatus of claim 19, wherein the processing system is configured to control the gain control unit with a reward evaluation unit.

24. The apparatus of claim 23, wherein the reward evaluation unit is modeled on behavior of an orbito-frontal cortex (OFC).

25. The apparatus of claim 23, wherein the at least two different neural activity modes comprise a tonic mode and a phasic mode and wherein the reward evaluation unit comprises:
a phasic neuron group for driving the phasic mode of the gain control unit; and
a tonic neuron group for driving the tonic mode of the gain control unit, wherein the tonic neuron group comprises an excitatory neuron group and an inhibitory neuron group.

26. The apparatus of claim 25, wherein the processing system is further configured to:
determine an actual reward based on at least one of the received input stimuli;
determine a predicted reward based on at least one of the received input stimuli; and
modulate synaptic plasticity of the phasic neuron group or the tonic neuron group based on a difference between the predicted reward and the actual reward.

27. The apparatus of claim 26, wherein the processing system is configured to determine the predicted reward by using a temporal difference (TD) learning algorithm.

28. The apparatus of claim 26, wherein the processing system is configured to modulate the synaptic plasticity by outputting a second neuromodulation signal to the reward evaluation unit and wherein a level of the second neuromodulation signal is based on the difference between the predicted reward and the actual reward.

29. The apparatus of claim 28, wherein a high level of the second neuromodulation signal enables synaptic potentiation to remember an association and wherein a low level of the second neuromodulation signal results in synaptic depression to forget the association.

30. The apparatus of claim 28, wherein a high level of the second neuromodulation signal:
strengthens synapses between the excitatory neuron group and the inhibitory neuron group of the tonic neuron group, such that the tonic neuron group is inhibited and will not drive the tonic mode of the gain control unit; and
strengthens synapses associated with the phasic neuron group, such that the phasic neuron group will drive the phasic mode of the gain control unit.

31. The apparatus of claim 30, wherein a low level of the second neuromodulation signal weakens the strengthened synapses both associated with the phasic neuron group and between the excitatory neuron group and the inhibitory neuron group, such that the tonic neuron group will drive the tonic mode of the gain control unit and the phasic neuron group will not drive the phasic mode of the gain control unit.

32. The apparatus of claim 28, wherein the processing system comprises a prediction error computation unit and wherein the determining the actual and predicted rewards and the outputting the second neuromodulation signal is performed by the prediction error computation unit.

33. The apparatus of claim 32, wherein the prediction error computation unit is modeled on behavior of a ventral tegmental area (VTA).

34. The apparatus of claim 28, wherein the second neuromodulation signal comprises a dopamine (DA) signal.

35. The apparatus of claim 19, wherein the first neuromodulation signal comprises a norepinephrine (NE) signal.

36. The apparatus of claim 19, wherein the processing system is further configured to send the output signal to an output unit and wherein the output unit is modeled on behavior of a motor neuron.

37. An apparatus for generating neural adaptive behavior, comprising:
means for receiving one or more input stimuli;
means for processing the received input stimuli to generate an output signal, wherein the means for processing is modulated with a first neuromodulation signal generated by a gain control unit; and
means for controlling the gain control unit to switch between at least two different neural activity modes, wherein at least one of a level or timing of the first neuromodulation signal generated by the gain control unit is determined based on the neural activity modes.

38. The apparatus of claim 37, wherein the gain control unit is modeled on behavior of a locus coeruleus (LC).

39. The apparatus of claim 37, wherein the at least two different neural activity modes comprise a tonic mode and a phasic mode.

40. The apparatus of claim 39, wherein the tonic mode is associated with periods of exploration and wherein the phasic mode is associated with periods of exploitation.

41. The apparatus of claim 37, wherein the means for controlling the gain control unit is configured to control the gain control unit with a reward evaluation unit.

42. The apparatus of claim 41, wherein the reward evaluation unit is modeled on behavior of an orbito-frontal cortex (OFC).

43. The apparatus of claim 41, wherein the at least two different neural activity modes comprise a tonic mode and a phasic mode and wherein the reward evaluation unit comprises:
a phasic neuron group for driving the phasic mode of the gain control unit; and a tonic neuron group for driving the tonic mode of the gain control unit, wherein the tonic neuron group comprises an excitatory neuron group and an inhibitory neuron group.

44. The apparatus of claim 43, further comprising:
means for determining an actual reward;
means for determining a predicted reward based on at least one of the received input stimuli; and
means for modulating synaptic plasticity of the phasic neuron group or the tonic neuron group based on a difference between the predicted reward and the actual reward.

45. The apparatus of claim 44, wherein the means for determining the predicted reward is configured to use a temporal difference (TD) learning algorithm.

46. The apparatus of claim 44, wherein the means for modulating is configured to output a second neuromodulation signal to the reward evaluation unit and wherein a level of the second neuromodulation signal is based on the difference between the predicted reward and the actual reward.

47. The apparatus of claim 46, wherein a high level of the second neuromodulation signal enables synaptic potentiation to remember an association and wherein a low level of the second neuromodulation signal results in synaptic depression to forget the association.

48. The apparatus of claim 46, wherein a high level of the second neuromodulation signal:
strengthens synapses between the excitatory neuron group and the inhibitory neuron group of the tonic neuron group, such that the tonic neuron group is inhibited and will not drive the tonic mode of the gain control unit; and
strengthens synapses associated with the phasic neuron group, such that the phasic neuron group will drive the phasic mode of the gain control unit.

49. The apparatus of claim 48, wherein a low level of the second neuromodulation signal weakens the strengthened synapses both associated with the phasic neuron group and between the excitatory neuron group and the inhibitory neuron group, such that the tonic neuron group will drive the tonic mode of the gain control unit and the phasic neuron group will not drive the phasic mode of the gain control unit.

50. The apparatus of claim 46, wherein a prediction error computation unit comprises the means for determining the actual and predicted rewards and is configured to output the second neuromodulation signal.

51. The apparatus of claim 50, wherein the prediction error computation unit is modeled on behavior of a ventral tegmental area (VTA).

52. The apparatus of claim 46, wherein the second neuromodulation signal comprises a dopamine (DA) signal.

53. The apparatus of claim 37, wherein the first neuromodulation signal comprises a norepinephrine (NE) signal.

54. The apparatus of claim 37, further comprising means for sending the output signal to an output unit, wherein the output unit is modeled on behavior of a motor neuron.

55. A computer program product for generating neural adaptive behavior, comprising a non-transitory computer-readable medium comprising instructions executable to:
receive one or more input stimuli;
process the received input stimuli to generate an output signal, wherein the processing is modulated with a first neuromodulation signal generated by a gain control unit; and
control the gain control unit to switch between at least two different neural activity modes, wherein at least one of a level or timing of the first neuromodulation signal generated by the gain control unit is determined based on the neural activity modes.

56. The computer program product of claim 55, wherein the gain control unit is modeled on behavior of a locus coeruleus (LC).

57. The computer program product of claim 55, wherein the at least two different neural activity modes comprise a tonic mode and a phasic mode.

58. The computer program product of claim 57, wherein the tonic mode is associated with periods of exploration and wherein the phasic mode is associated with periods of exploitation.

59. The computer program product of claim 55, wherein controlling the gain control unit comprises controlling the gain control unit with a reward evaluation unit.

60. The computer program product of claim 59, wherein the reward evaluation unit is modeled on behavior of an orbito-frontal cortex (OFC).

61. The computer program product of claim 59, wherein the at least two different neural activity modes comprise a tonic mode and a phasic mode and wherein the reward evaluation unit comprises:
a phasic neuron group for driving the phasic mode of the gain control unit; and
a tonic neuron group for driving the tonic mode of the gain control unit, wherein the tonic neuron group comprises an excitatory neuron group and an inhibitory neuron group.

62. The computer program product of claim 61, further comprising instructions executable to:
determining an actual reward;
determining a predicted reward based on at least one of the received input stimuli; and
modulating synaptic plasticity of the phasic neuron group or the tonic neuron group based on a difference between the predicted reward and the actual reward.

63. The computer program product of claim 62, wherein determining the predicted reward comprises using a temporal difference (TD) learning algorithm.

64. The computer program product of claim 62, wherein the modulating comprises outputting a second neuromodulation signal to the reward evaluation unit, wherein a level of the second neuromodulation signal is based on the difference between the predicted reward and the actual reward.

65. The computer program product of claim 64, wherein a high level of the second neuromodulation signal enables synaptic potentiation to remember an association and wherein a low level of the second neuromodulation signal results in synaptic depression to forget the association.

66. The computer program product of claim 64, wherein a high level of the second neuromodulation signal:
strengthens synapses between the excitatory neuron group and the inhibitory neuron group of the tonic neuron group, such that the tonic neuron group is inhibited and will not drive the tonic mode of the gain control unit; and
strengthens synapses associated with the phasic neuron group, such that the phasic neuron group will drive the phasic mode of the gain control unit.

67. The computer program product of claim 66, wherein a low level of the second neuromodulation signal weakens the strengthened synapses both associated with the phasic neuron group and between the excitatory neuron group and the inhibitory neuron group, such that the tonic neuron group will drive the tonic mode of the gain control unit and the phasic neuron group will not drive the phasic mode of the gain control unit.

68. The computer program product of claim 64, wherein determining the actual and predicted rewards and outputting the second neuromodulation signal is performed by a prediction error computation unit.

69. The computer program product of claim 68, wherein the prediction error computation unit is modeled on behavior of a ventral tegmental area (VTA).

70. The computer program product of claim 64, wherein the second neuromodulation signal comprises a dopamine (DA) signal.

71. The computer program product of claim 55, wherein the first neuromodulation signal comprises a norepinephrine (NE) signal.

72. The computer program product of claim 55, further comprising instructions executable to send the output signal to an output unit, wherein the output unit is modeled on behavior of a motor neuron.

* * * * *